United States Patent [19]

Miller et al.

[11] 4,121,991

[45] Oct. 24, 1978

[54] ELECTROLYTIC CELL FOR TREATMENT OF WATER

[75] Inventors: Jorge Miller; Franz Stummer, both of Noham, Fed. Rep. of Germany

[73] Assignee: Firma Hans Einhell GmbH Industriegelande, Landau, Fed. Rep. of Germany

[21] Appl. No.: 705,710

[22] Filed: Jul. 15, 1976

[30] Foreign Application Priority Data

Feb. 26, 1976 [DE] Fed. Rep. of Germany ....... 2607906

[51] Int. Cl.² .......................... C02B 1/82; C02C 5/12; B01D 13/02
[52] U.S. Cl. .................... 204/260; 204/1 R; 204/151; 204/272; 204/273; 204/289
[58] Field of Search ............... 204/130, 131, 149, 151, 204/268, 272, 1 R, 222, 288, 289, 273, 260, 301, 180 P

[56] References Cited

U.S. PATENT DOCUMENTS

| 653,739 | 7/1900 | Jewell ............................. 204/222 X |
| 3,457,152 | 7/1969 | Maloney, Jr. et al. ............... 204/131 |
| 3,716,459 | 2/1973 | Salter et al. ...................... 204/1 R |
| 3,899,410 | 8/1975 | Aber et al. ....................... 204/149 X |
| 3,945,892 | 3/1976 | James et al. ..................... 204/1 R |
| 3,966,571 | 6/1976 | Gagnon et al. ..................... 204/149 |
| 3,969,201 | 7/1976 | Oloman et al. ................... 204/1 R X |

OTHER PUBLICATIONS

LeGoff et al., "Applications of Fluidized Beds in Electrochemistry," Industrial and Engin. Chem., vol. 61, No. 10, Oct. 1969, pp. 8–17.

*Primary Examiner*—Arthur C. Prescott
*Attorney, Agent, or Firm*—Stevens, Davis, Miller & Mosher

[57] ABSTRACT

The specification describes an electrolytic cell for the treatment, particularly the purification and sterilization of water, which comprises a closed container with a lower inlet opening and an upper outlet opening for the water and electrodes which are adapted to be connected with the positive pole and the negative pole of a DC source. In the interior of the electrolytic cell free movable particles are located whose density is higher than that of the water to be treated and which are prevented from leaving the electrolytic cell by suitable means adajcent to the inlet and the outlet.

6 Claims, 4 Drawing Figures

ELECTROLYTIC CELL FOR TREATMENT OF WATER

BACKGROUND OF INVENTION (1) Field to which invention relates

The invention relates to an electrolytic cell for the treatment of water, more particularly for the purification and sterilization of water; it relates in particular to a multipole electrolytic cell, which can be used in the most varied fashions for the treatment, and more particularly for the purification and sterilization of water, and comprises a closed container with a lower inlet opening and an upper outlet opening for the water and at least two electrodes within the container, which are adapted to be connected with the positive and negative pole of a DC source.

(2) The prior art

The most varied types of electrolytic cells for the treatment, and more particularly for the purification and sterilization of water, have been proposed. With these known cells it is possible to remove the dissolved and suspended contaminating materials comprised in the water to be treated electrolytically by using either consumble or not-consumable electrodes of iron, aluminum, copper, silver, platinum, carbon etc. However, during operation of such electrolytic cells many problems are encountered which are due to different causes.

Normally during electrolysis of water, especially of hard water, the cathode is rapidly covered by a skin of calcium carbonate which inhibits the flow of current; anodes of silver, copper, iron, aluminum etc. during the electrolysis are covered with oxide films. In case of aluminum anodes the formed aluminum oxide prevents the flow of current. In the case of silver, iron and copper anodes the formed oxide film is highly conductive, so that the dissolution of the metal is prevented and oxygen is produced at the electrodes.

Another problem encountered in electrolytical water purification systems is that the water normally encountered has only a very small number of ions and that, although platinum anodes can provide oxidation, the oxidation-reduction potential of the water remains very low. E.g., if chloride is to be produced, the chloride concentration in the water must be very high and this concentration is normally not encountered in fresh water, particularly drinking water.

The standard electrolytical technique to chlorinate water in swimming-pools is to provide a separate cell containing a high concentration of common salt which upon electrolysis gives sodium hypochlorite or chlorine which is fed into the swimming-pool. Theoretically, it is possible to add sufficient common salt to the swimming-pool water and to electrolyze it directly. However, this technique has the disadvantage that the water tastes salty to the bathers and that the calcium contained in the water deposits onto the cathodes to such an extent that the flow of the current stops. Changing of polarity to remove the calcium deposits on the cathodes has been found in practice only to lead to corrosion of the cathode and aggravates the problem.

SUMMARY OF INVENTION

It is one object of the present invention to prevent the formation of deposits on the electrodes which stop the flow of current and the dissolution of metal electrodes required for water purification.

It is another object of this invention to keep clean electrodes within the electrolytic cell by means of a fluidized (agitated) bed of particles whose movements and impacts continuously scratch off any deposits formed on the surfaces of the electrodes.

It is a further object of the invention to effect the concentration of ions contained in the water by electrodialysis so that these ions can be electrolyzed to produce effective oxidizing agents.

It is another object of the invention to dispose the electrodes within the cell in such way that they are corroded evenly and radially.

It is another object of the invention to effect electrodialysis by using an electrodialysis diaphragm surrounding the anode, forming a closed anode compartment, wherein water flows at a very flow rate compared with the main flow or not at all and wherein the negative ions are concentrated.

It is another object of the invention to use the same current for ion concentration as well as for achieving the electrolytical oxidation of concentrated ions.

The above and other objects are realized in accordance with the present invention by providing a new and improved electrolytic cell, having particular utility in water treatment systems, especially in water purification and sterilization systems, used in various installations requiring clear, soft, sterile water, e.g. swimming-pools, water works, sewage plants etc.

DETAILED DESCRIPTION OF INVENTION

The above mentioned and other objects according to the present invention are achieved by an electrolytic cell for the treatment more particularly for the purification and sterilization of water, which comprises a closed container with a lower inlet opening an upper outlet opening for the water and at least two electrodes which are adapted to be connected with the positive and with the negative poles of a DC source, characterized in that in the interior of the container (electrolytic cell) free movable particles are located whose density is higher than that of the water to be treated as well as means for retaining the particles within the container (electrolytic cell).

DESCRIPTION OF PREFERRED EMBODIMENTS

According to one preferred embodiment of the invention the electrolytic cell comprises a cylindrical container with a lower inlet opening and an upper outlet opening for the water flow and radially disposed cathodes and a centrally located anode, surrounded by a porous electrodialysis diaphragm completely surrounding it forming a closed anode compartment having a small upper aperture for the escape of produced gases and of liquids that have permeated through the porous diaphragm.

Near the inlet and near the outlet grids are located whose function is to prevent particles placed within the cell from escaping through the inlet or outlet of the cell. These particles, due to the velocity of the water flow, are fluidized or agitated thus forming an agitated or fluidized bed of particles surrounding the cathodes, and by their movement continuously clean the electrodes in a mechanical way. Due to the electrical potential difference between the electrodes a concentration gradient is established which serves through the electrodialysis to concentrate the anions within the anode compartment, E.g., if water containing 3 ppm chloride ions is electrolyzed without using a electrodialysis diaphragm no chlorine is produced, but only oxygen is produced at the anode. Once the diaphragm is used, the chloride concentration increases within the anode compartment up to a level that causes the formation of free chlorine. If chloride ions are absent, other ions like carbonate ions or sulphate ions contained in the water, concentrate within the anode compartment forming through electrolysis percarbonate or persulphate which are also excellent oxidizing agents. In the same way any organic acid will be oxidized.

Another preferred embodiment of the invention is realized with an electrolytic cell comprising a optionally transparent cylinder as container having a lower inlet opening and an upper outlet opening, each provided with grids. In the interior of the cylinder there are radially disposed electrodes whose length in the axial direction of the cylinder is about ½ to ⅔ of the length of the cylinder, and in the centre of the cylinder there is disposed a concentrical cylindrical anode ring compartment defined by an outer cylindrical diaphragm and an inner concentrical cylindrical pipe with the anode therebetween. The anode ring compartment is closed at both ends and has at least one upper small opening to permit the escape of products formed within the anode compartment. The axial length of anode, anode compartment and inner pipe is about the same as that of the cathodes outside the anode compartment. Within the cylinder (the outer wall of the cell) and outside the anode compartment there is placed a sufficient number of particles whose size is greater than that of the openings of the grids. These particles by the flowing water within the cell are agitated and rise up to surround the cathodes (in the cathode compartment), thereby cleaning them mechanically through impacts and scratches. The upper free space in the interior of the cell serves as a disengaging space for the particles so that, in case the water-flow rate is too high, the particles do not become entrained and held at the upper grid. The purpose of the central pipe (inner boundary of the anode ring compartment) is to permit a recirculation of the particles forming upwardly in the cathode compartment and downwardly through the inner pipe, especially when the lower grid under the lower end of the central pipe is blocked at its center, i.e. has no apertures.

Further objects, advantages and preferred embodiments of the invention are obvious from the following illustrating description of the invention in connection with the accompanying drawings and claims. It is to be noted that in the accompanying drawings like parts are denoted by like reference numerals.

THE DRAWINGS

Figure 1:
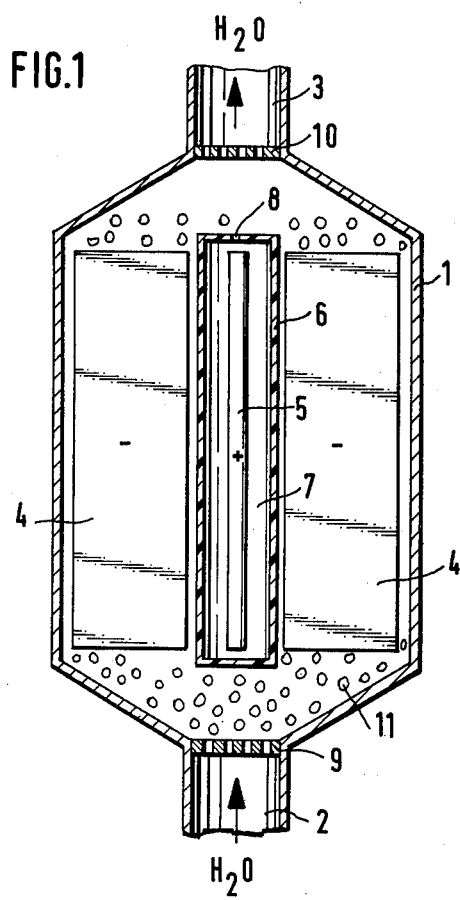
FIG. 1 illustrates a preferred embodiment of the electrolytic cell of the invention.

FIG. 1 shows a preferred embodiment of the electrolytic cell of the invention in a schematical manner consisting of a cylindrical container 1 with a lower inlet 2 and an upper outlet 3 for the water-flow and radially disposed cathodes 4 as well as a centrally, axially located anode 5 surrounded by a porous electrodialysis diphragm 6 completely surrounding it, forming a closed anode compartment 7 having a small upper aperture 8 for the escape of produced gases and of liquids that have permeated through the porous diaphragm 6. Located below, near the inlet 2 and above, near the outlet 3 there are grids 9 and 10, respectively, whose function is to prevent that particles 11 placed within the cell escape through the inlet 2 or outlet 3 of the cell.

Figure 2:
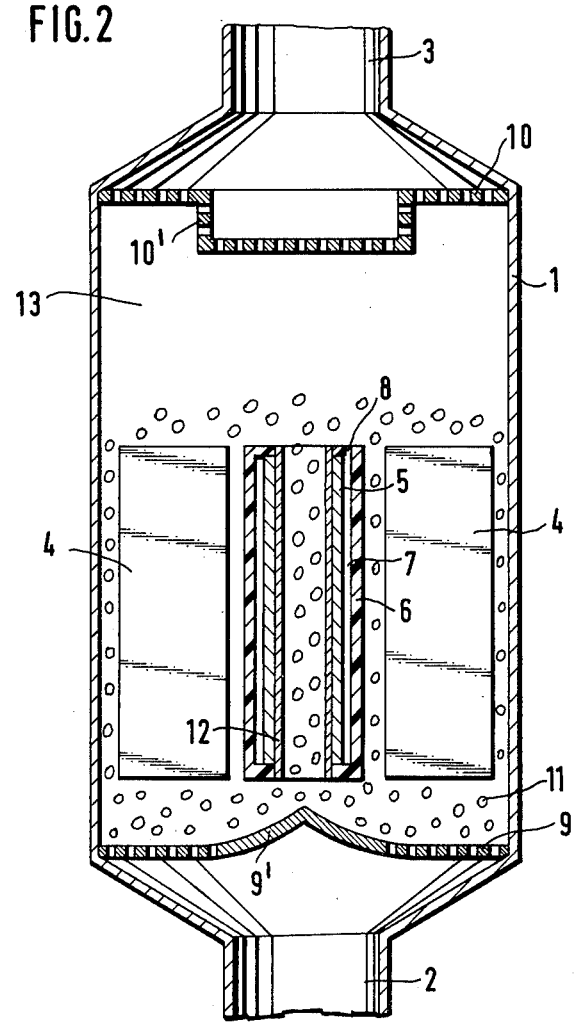
FIG. 2 illustrates another preferred embodiment of the electrolytic cell of the invention.

FIG. 2 shows another preferred embodiment of electrolytic cell of the invention comprising a cylinder 1 having a lower inlet 2 and an upper outlet 3 provided with grids 9 and 10, respectively. In the interior of the cylinder 1 there are radially disposed electrodes (cathodes) 4 whose length in the axial direction of the cylinder 1 is shorter than the total length of the cylinder (cell) 1. The axial length of anode 5, anode compartment 7 and inner pipe 12 is about the same as that of the cathodes 4. Within the cylinder 1 are placed sufficient particles 11 whose size is greater than that of the openings of grids 9, 10. The upper free space in the interior of cell 1 serves as disengaging space 13 for the particles. The central part 9' of lower grid 9 has no apertures. The upper grid 10 has apertures both in the horizontal portions and in the vertical cylindrical portions 10' to provide a greater area.

Figure 3:
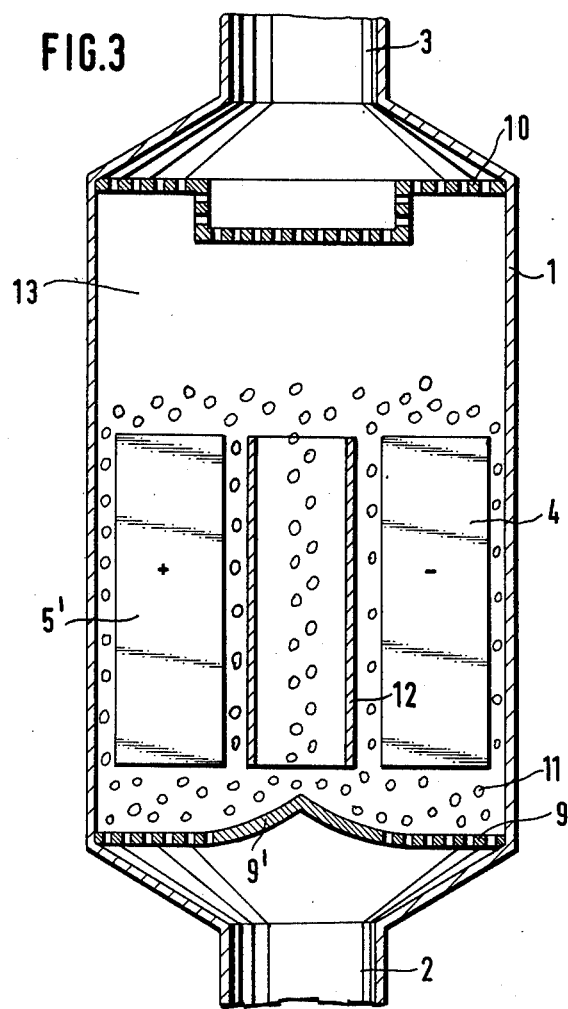
FIG. 3 illustrates a further preferred embodiment of the electrolytic cell of the invention.

FIG. 3 shows a further preferred embodiment of the electrolytic cell of the invention comprising a cylinder 1 having a lower inlet 2 and an upper outlet 3 provided with grids 9 and 10, respectively. In the interior of the cylinder 1 there are radially disposed alternating cathodes 4 and anodes 5'. The center of the cell 1 is provided with a pipe 12 open at both ends which serves to lead the particles 11 downwardly. Below pipe 12 there is positioned a grid 9 whose central part 9' is closed to the flow of water, and above electrodes 4 and 5' and pipe 12 there is provided a disengaging space 13.

Figure 4:
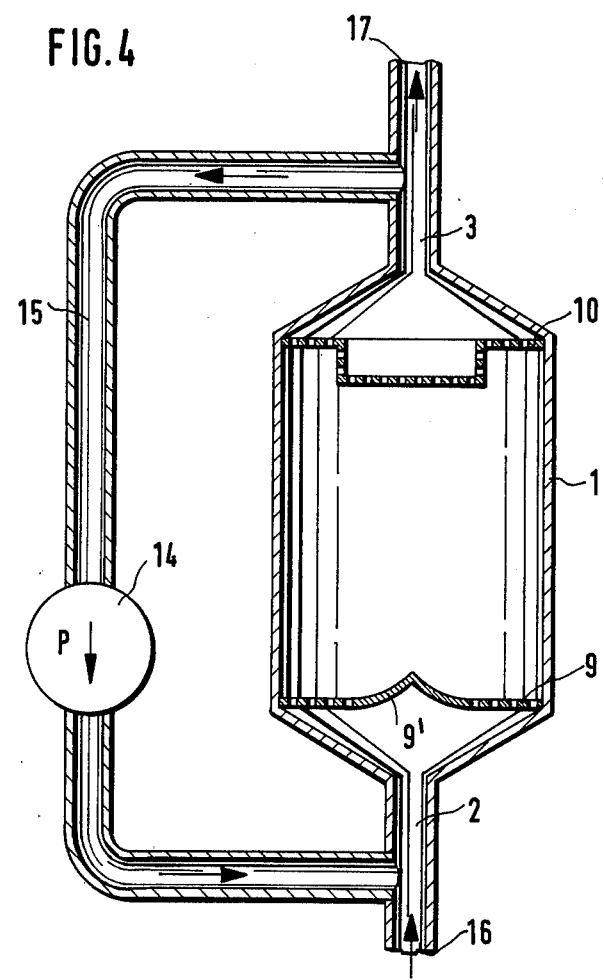
FIG. 4 illustrates a particularly preferred embodiment of the electrolytic cell of the invention.

FIG. 4 shows a particularly preferred embodiment of the invention wherein in cell 1 the inlet 2 and the outlet 3 are connected to by-pass conduit 15 outside cell 1. In by-pass conduit 15 there is interposed pump 14 which serves to recirculate the water through cell 1 to provide sufficient flow rate in order to agitate and entrain the particles within cell 1. It is also provided with an inlet 16 for the raw water and an outlet 17 for the treated water.

With reference to FIG. 2 a further preferred embodiment is obtained by omitting the electrodialysis diaphragm 6 and by using corrodable metals for anode 5.

It is also possible to dispose an energized turbine or propeller (not shown) within pipe 12 of FIGS. 2 to 4 to provide additional reflux and to ensure enough contact time between particles 11 and electrodes 4, 5'.

With reference to FIGS. 1 to 4 it is also possible and beneficial to provide an additional outer pipe (not shown) between the radially disposed electrodes 4 or 4, 5' and the outer cylinder 1. The distance between this pipe and the outer cylinder 1 must be large enough to allow the free downward flow of particles 11. The holes in the lower grid 9 can be closed along the periphery of grid 9 at least to an extent corresponding to the distance between the outer pipe and cylinder 1.

The materials for constructing the electrolytic cell of the invention, e.g. as illustrated in FIGS. 1 and 2, are as follows:

The anodes preferably consist of platinized titanium or niobium in mesh form, although they also can be of any other metal of the platinum family that resist corrosion or they can consist of graphite or carbon or metal oxides. The anodes can be solid or have the form of a grid.

The corrodable anodes of FIGS. 3 and 4 preferably are chosen from the metals commonly used in the water treatment, like aluminum, iron or copper for the provision of flocking materials in water treatment processes or metals like silver and copper to provide obligodynamic desinfecting ions to the water being treated.

As material for the cathodes any conductive material can be used, preferably metals like stainless steel, copper etc.

Usable materials for the construction of the cylinder, inlet, outlet, grids, pipes and supports are e.g. plastics, porcelain, glass, hard rubber and concrete or metal, wherein the metal can act as cathode.

Materials for the electrodialysis diaphragms are e.g. porous porcelain, microporous plastics like polyolefines and polyvinylchloride, cellulosenitrate, and ion exchange resins. In case the porous diaphragms are mechanically sensitive to the impacts of the particles they can be shielded with a protective grid of a non-conductive material like plastic.

The particles within the cell can be spheres of porcelain, hard plastics, stone, glass, alumina and any other hard materials whose density must be greater than that of the water to be treated. Of course, the size of these particles must be larger than that of the openings of the grids which are to retain them within the cell.

The invention has been explained above with reference to preferred embodiments. It is however quite obvious to a man skilled in the art that it is in no way limited to such embodiments and that it can be modified and changed in many respects without leaving the scope of the invention defined in the claims.

For examples, the cell need not be cylindrical, but can be elliptical, hexagonal and the like, in section. Also the closed grid area can have many other shapes depending on the flow pattern required within the cell. It is also possible, for example, to combine the central anode with additional radially disposed anodes of the same or any other metal with or without centrally or outwardly located downflow pipes or any other combination thereof.

We claim:

1. Electrolytical cell for the treatment of water which comprises a closed container with a lower inlet opening and an upper outlet opening for the water, negative electrodes therein at least one of which is radially disposed which are adapted to be connected with the negative pole of a DC source, freely movable non-conductive particles whose density is higher than that of the water to be treated positioned within said container and contacting said water and said negative electrodes on all sides, means for retaining the particles within the container and a closed cylindrical positive electrode compartment defined by an electrodialysis diaphragm and a concentrical pipe with said positive electrode provided therein connectable with the positive pole of said DC source, said compartment having a small upper aperture.

2. Electrolytical cell according to claim 1, characterized in that in the interior of the container there is disposed a pipe open at both ends, the lower end thereof being spaced from a lower grid covering the lower inlet, and the upper end thereof being spaced from an upper grid located before the upper outlet, wherein the distances between the pipe and each of the grids are greater than the greatest particle diameter.

3. Electrolytic cell according to claim 2, characterized in that the distance between the upper end of the pipe and the upper grid is at least 10 percent of the length of the pipe.

4. Electrolytical cell according to claim 2, characterized in that in the interior of the pipe there is disposed a propeller.

5. Electrolytic cell according to claim 1, characterized in that outside the container there is situated a bypass conduit connected at its both ends each to the outlet and to the inlet of the container, having an interposed pump.

6. Electrolytical cell according to claim 1, characterized in that the container is cylindrical in its shape and that in the interior of the cylindrical container there is disposed centrally and axially a closed anode ring compartment defined by an inner tube closed at both ends and an outer concentrical electrodialysis diaphragm with the anode therein provided with an upper small aperture.

* * * * *